US 8,171,400 B2

(12) United States Patent
Nomizo

(10) Patent No.: US 8,171,400 B2
(45) Date of Patent: May 1, 2012

(54) IMAGE TRANSMISSION APPARATUS FOR TRANSMITTING IMAGE TO A PLURALITY OF IMAGE PROJECTION APPARATUSES AND IMAGE DISPLAY CONTROL METHOD IN IMAGE TRANSMISSION APPARATUS

(75) Inventor: Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 849 days.

(21) Appl. No.: 12/246,335

(22) Filed: Oct. 6, 2008

(65) Prior Publication Data
US 2009/0096939 A1 Apr. 16, 2009

(30) Foreign Application Priority Data
Oct. 10, 2007 (JP) ................................. 2007-264040

(51) Int. Cl.
*G06F 17/00* (2006.01)
(52) U.S. Cl. ...................................................... 715/243
(58) Field of Classification Search .................. 715/243, 715/244, 245, 246, 247
See application file for complete search history.

(56) References Cited

U.S. PATENT DOCUMENTS

| | | | | |
|---|---|---|---|---|
| 5,187,570 A * | 2/1993 | Hibi et al. | ...................... | 358/520 |
| 5,442,464 A * | 8/1995 | Ito | ................................. | 358/482 |
| 6,202,073 B1 * | 3/2001 | Takahashi | ...................... | 715/204 |
| 6,411,302 B1 * | 6/2002 | Chiraz | ........................... | 345/545 |
| 2002/0000998 A1 * | 1/2002 | Scott et al. | ..................... | 345/667 |
| 2003/0229900 A1 * | 12/2003 | Reisman | ......................... | 725/87 |
| 2007/0106950 A1 * | 5/2007 | Hutchinson et al. | .......... | 715/761 |
| 2007/0234223 A1 * | 10/2007 | Leavitt et al. | ................. | 715/762 |
| 2008/0270946 A1 * | 10/2008 | Risch et al. | .................... | 715/848 |

FOREIGN PATENT DOCUMENTS

JP 2000-339130 12/2000
JP 2007-240813 A 9/2007

* cited by examiner

*Primary Examiner* — Laurie Ries
(74) *Attorney, Agent, or Firm* — AdvantEdge Law Group, LLC

(57) ABSTRACT

An image transmission apparatus includes a display device, a display image data generator, a storage device, a storage controller, a transmitter, and a display controller. The image transmission apparatus is connectable to a plurality of image projection apparatuses. The display image data generator is configured to generate display image data, the storage device is configured to store the display image data, and the transmitter is configured to transmit the display image data for display on each image transmission apparatus connected to the image transmission apparatus according to an overall layout display for the combination of potentially connected image transmission apparatuses. The display controller is configured to display an image on the display device using the display image data and to display a plurality of layout display images corresponding to the display image data transmitted to the image projection apparatuses in a layout display region on the display device.

15 Claims, 10 Drawing Sheets

| STORAGE REGION FOR PROJECTOR TRANSMISSION | WINDOW | STORAGE REGION FOR STORAGE OF DISPLAY IMAGE DATA |
|---|---|---|
| SPJ1 | | |
| SPJ2 | W2 | A1 |
| SPJ3 | W3 | A2 |

| PROJECTOR | WINDOW | STORAGE REGION |
|---|---|---|
| PJ1 | W2 | A1 |
| PJ2 | W2 | A2 |
| PJ3 | W3 | A3 |
| PJ4 | — | A4 |

IMAGE TRANSMISSION APPARATUS FOR TRANSMITTING IMAGE TO A PLURALITY OF IMAGE PROJECTION APPARATUSES AND IMAGE DISPLAY CONTROL METHOD IN IMAGE TRANSMISSION APPARATUS

CROSS REFERENCE TO RELATED APPLICATIONS

The present application claims priority and incorporates herein by reference in its entirety Japanese Patent Application No. 2007-264040 filed Oct. 10, 2007.

BACKGROUND

An image projection apparatus is used in a state where the image projection apparatus is connected to an image transmission apparatus, for example, a personal computer, in order to project content for presentation onto a projection surface, for example. A known image transmission apparatus generates display image data using a display image of a display device as a unit and displays an image on the display device using the generated display image data. Accordingly, in the case of displaying an image displayed on the display device by using the image projection apparatus, it was not possible to meet such a request that some content on a display screen, for example, only content for presentation of a presenter be displayed, since the display image data was transmitted to the image projection apparatus.

In order to solve such a problem, a technique of outputting window data of a window, which is selected from a plurality of windows displayed on a display device by a mouse pointer, to an external monitor as referred to in Japanese Patent Publication No. JP-A-2000-339130.

However, in the case where a plurality of image projection apparatuses were connected to an image transmission apparatus, it was not possible to transmit a plurality of contents displayed on a display device to the desired respective image projection apparatuses. In addition, in the case of content some of which was displayed on a display device, it was not possible to project the entire content through the image projection apparatus.

In addition, this problem is not limited to an image transmission apparatus to which a plurality of image projection apparatuses are connected but is a common problem in an image transmission apparatus to which a plurality of external display devices are connected.

SUMMARY

Various embodiments described in the disclosure allow a desired portion of content of a plurality of content portions on a display screen to be projected onto a plurality of image projection apparatuses, respectively, and to improve the convenience in operating projected content.

Image transmission systems for use with a plurality of connected image projection apparatuses have been developed in response to the current state of the art, and in particular, in response to these and other problems, needs, and demands that have not been fully or completely solved by currently available protection systems. More specifically, embodiments of the disclosure below solve at least a part of these problems.

According to one embodiment of the disclosure, an image transmission apparatus to which a plurality of image projection apparatuses are connectable is provided. The image transmission apparatus according to one embodiment of the disclosure includes: a display device capable of displaying a plurality of contents; a display image data generator, such as a generating portion that generates display image data of each content at least a part of which is displayed on the display device; a storage device that stores the display image data in a storage location corresponding to a projection position of an image projected by each of the image projection apparatuses; a storage controller, such as a storage control portion that stores the correspondence relationship between each of the image projection apparatuses connected and each of the generated display image data in the storage device; a transmitter, such as a transmission portion that transmits each of the corresponding display image data to each of the image projection apparatuses; and a display controller, such as a display control portion that displays an image on the display device using the display image data and displays a plurality of layout display images, which correspond to the display image data transmitted to the image projection apparatuses, in a layout display region on the display device.

According to one embodiment of the disclosure, the correspondence relationship between each of the image projection apparatuses connected and each of the generated display image data is stored in the storage device and each of the corresponding display image data is transmitted to each of the image projection apparatuses. Accordingly, desired contents of a plurality of contents on the display screen can be respectively projected to the plurality of image projection apparatuses. In addition, since a plurality of layout display images, which correspond to the display image data transmitted to the image projection apparatuses, can be displayed in a layout display region on the display device, the convenience in operating the projected contents can be improved.

In various embodiments of the disclosure, it may be possible to further include an image processor, such as an image processing portion that when an operation is performed on the layout display image executes image processing reflecting the performed operation on the display image data corresponding to the layout display image on which the operation has been performed. In this case, an operation on an image projected from an image projection apparatus can be executed by the operation on the layout display image.

In one embodiment of the disclosure, the operation may be an operation of changing the size of the layout display image, the image processor may convert the resolution of the display image data according to the change of the size, and the transmitter may transmit the display image data, on which the image processing has been performed, to the corresponding image projection apparatus. In this case, the size of an image projected from an image projection apparatus can be changed by the size changing operation on the layout display image.

In one embodiment of the disclosure, the display controller may display an image, the size of which has been changed, on the display device using the display image data on which the image processing has been performed. In this case, an image after size change can be checked on the display device.

In one embodiment of the disclosure, the operation may be an operation of changing the display position of the layout display image, the image processor may change the storage location of the display image data in the storage device according to the change of the display position, and the transmitter may transmit the display image data, on which the image processing has been performed, to the corresponding image projection apparatus. In this case, the projection position of an image projected from an image projection apparatus can be changed by the operation of changing the display position with respect to the layout display image.

In one embodiment of the disclosure, it may be possible to further include a selection portion for selecting one content from a plurality of contents displayed on the display device and a designation portion that designates the image projection apparatus to project the selected content. The storage controller may store the correspondence relationship between the selected display image data and the designated image projection apparatus in the storage device. In this case, the selected content and the designated image projection apparatus can be matched with each other.

In one embodiment of the disclosure, the storage controller may secure a content storage region for storing the display image data in the storage device corresponding to the number of contents displayed on the display device, and the display image data may be stored in a storage location corresponding to the projection position of an image in each content storage region projected by the image projection apparatus. In this case, desired contents can be respectively projected onto the plurality of image projection apparatuses by associating content displayed on the display device with the image projection apparatuses and the storage region where the content is stored. In addition, the projection position of an image projected by the image projection apparatus can be changed by the change of a storage location.

In one embodiment of the disclosure, the image processor may execute image processing on the image data in the content storage region. In this case, image processing can be executed in a unit of content.

In one embodiment of the disclosure, the storage controller may secure a transmission storage region for storing the display image data, which is to be transmitted to the image projection apparatus, in the storage device corresponding to the number of image projection apparatuses connected, and the display image data may be stored in a storage location corresponding to the projection position of an image in each transmission storage region projected by the image projection apparatus. In this case, desired contents can be respectively projected onto the plurality of image projection apparatuses by transmitting display image data from a storage device, which is associated with an image projection apparatus, to an image projection apparatus.

In one embodiment of the disclosure, the image processor may execute image processing on the image data in the transmission storage region. In this case, image processing can be executed in a unit of image projection apparatus.

In one embodiment of the disclosure, the content storage region may be secured corresponding to the arrangement of the image projection apparatuses connected, the storage controller may store the display image data in a plurality of content storage regions corresponding to the adjacent image projection apparatuses in the case where the capacity of the display image data exceeds the capacity of the content storage region, and the display controller may display a layout display image corresponding to the display image data in the plurality of adjacent layout display regions. In this case, since display image data of one window a part of which is displayed on the display device can be stored in a plurality of storage regions, the layout of a corresponding window in a layout display region can be checked. Moreover, the corresponding window can be projected by the plurality of image projection apparatuses.

In one embodiment of the disclosure, an aspect ratio of the layout display region may be the same as that of a display screen of the display device. In this case, the appearance of a display image on the display device can be made to match that of an image projected by an image projection apparatus.

In one embodiment of the disclosure, the display controller may change the overlapping order of the plurality of layout display images in the layout display region in response to an operation of changing the overlapping order of the plurality of layout display images. In this case, the overlapping order of the layout display images can be changed.

According to at least one embodiment of the disclosure, an image display control method in image transmission is provided. According to at least one embodiment of the disclosure, the image display control method in image transmission includes: generating display image data of each content at least a part of which is displayed on a display device; storing the correspondence relationship between each of image projection apparatuses connected and each of the generated display image data in a storage device; transmitting each of the corresponding display image data to each of the image projection apparatuses; and displaying a plurality of layout display images, which correspond to the display image data transmitted to the image projection apparatuses, in a layout display region on the display device.

According to other embodiments of the disclosure, the same advantages obtained by a first configuration of the disclosure can be obtained by different configurations. These other embodiments of the disclosure may be realized in various configurations like the first configuration of the disclosure. In addition, at least one embodiment of the disclosure may also be realized as a computer program or software, such as a computer program recorded in computer readable media, such as a CD, a DVD, and an HDD.

BRIEF DESCRIPTION OF THE DRAWINGS

Embodiments of the disclosure are described with reference to the accompanying drawings, wherein like reference numbers designate like elements.

DESCRIPTION OF EMBODIMENTS

Figure 1:
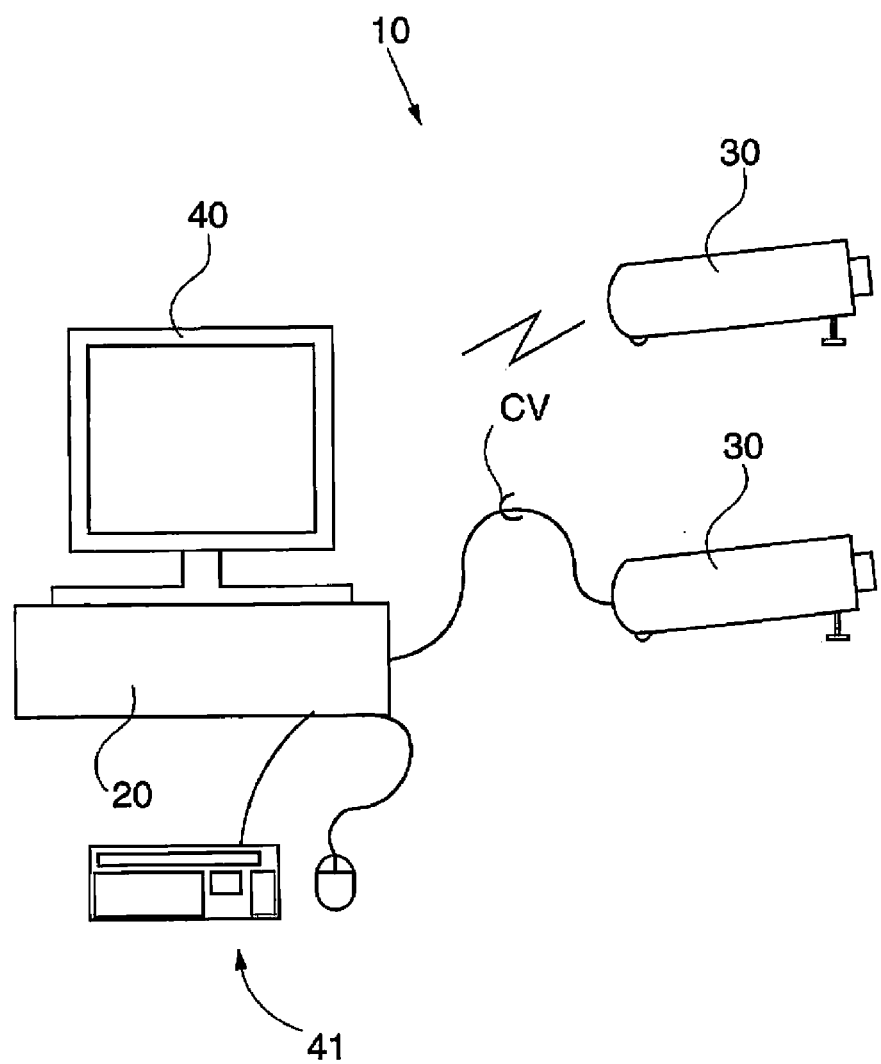
FIG. 1 is an explanatory view illustrating the schematic configuration of an image transmission system including an image transmission apparatus according to the present embodiment.

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may.

As used herein, the term "software" refers broadly to any set of computer readable instructions embodied on one or more computer readable media, the instructions being executable by a computing device. Software may include one or more computer programs or applications. Data related to software may include configuration data such as file system and registry data associated with the software, including data representative of file system and configuration activity associated with operation and/or installation of the software.

As used herein, the terms "processor", "generator", "controller", and "transmitter" refer broadly to devices consisting of any set of circuits, general purpose processors (e.g., microprocessors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions configured to perform the action described. The executable instructions may be embodied in firmware logic, reconfigurable logic, a hardware description language, a state machine, an application-specific integrated circuit (ASIC), or combinations thereof. The appearances of each of these terms in various places in the specification do not necessarily all refer to the same embodiment of that device, but it may. Moreover, in various embodiments each "processor", "generator", "controller", and "transmitter" device may share some common components with other devices in an image transmission apparatus.

Hereinafter, an image transmission apparatus and an image transmission method according to embodiments of the disclosure will be described with reference to the accompanying drawings. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment.

First Embodiment

Configuration of an Image Transmission System

Figure 2:
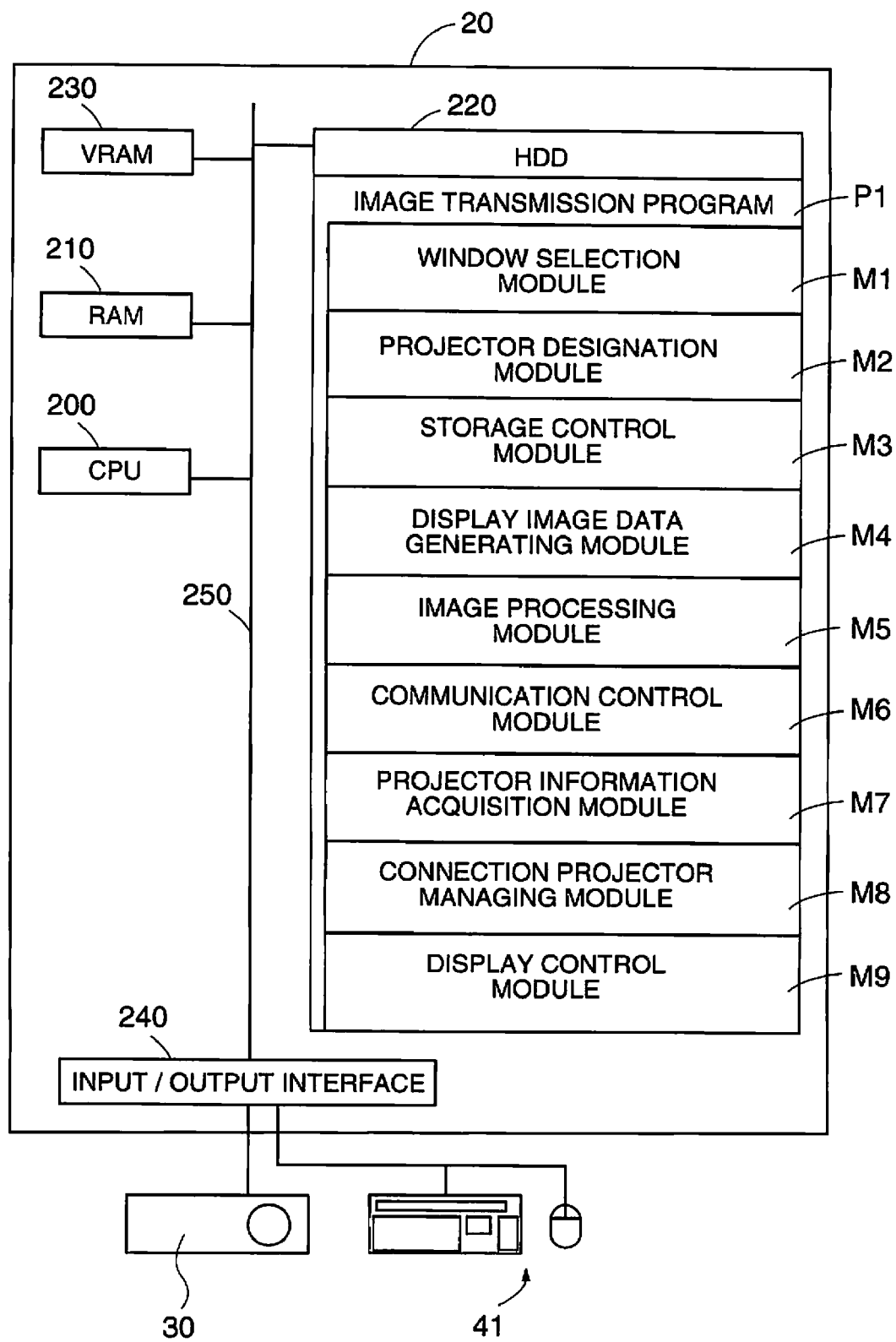
FIG. 2 is a functional block diagram schematically illustrating the internal configuration of the image transmission apparatus according to the present embodiment.
Figure 3:
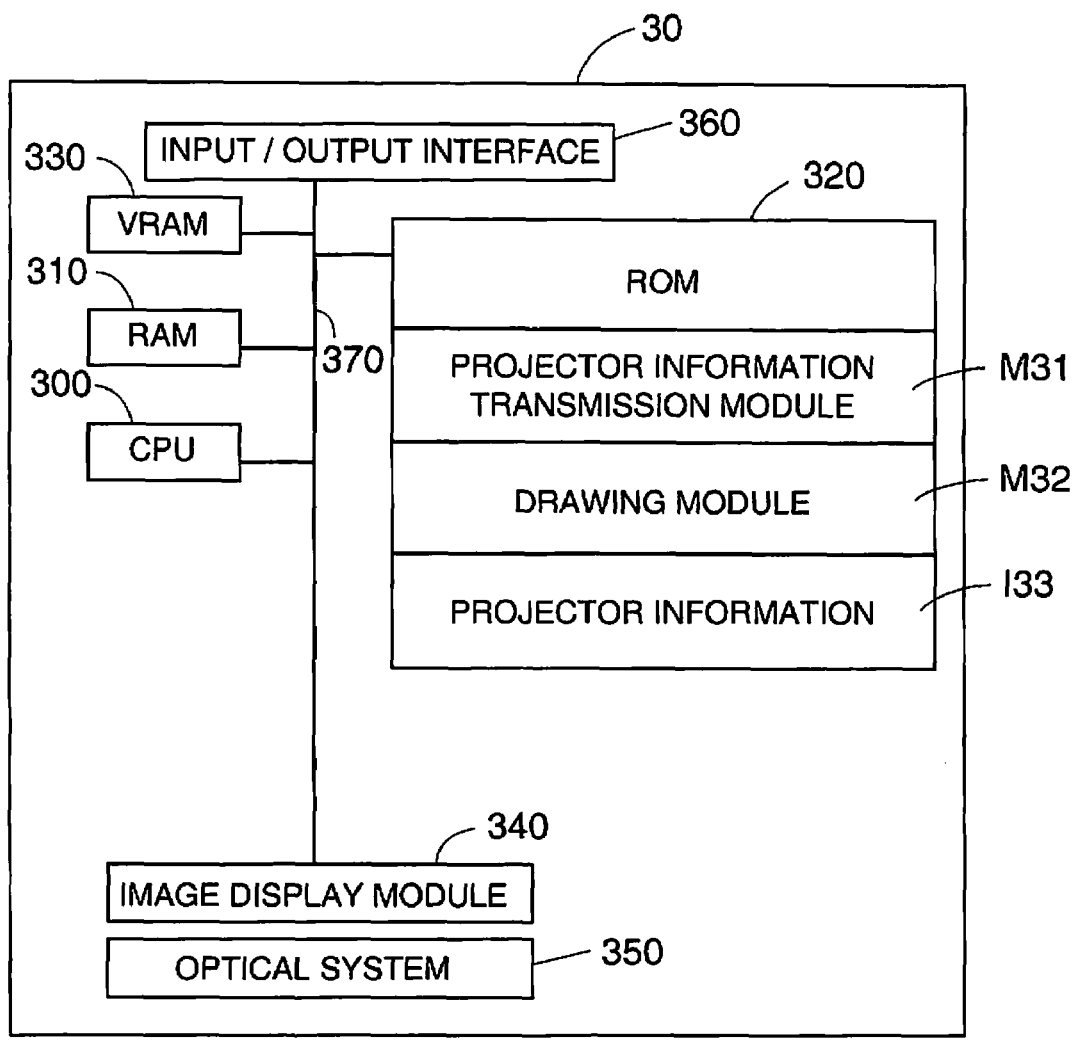
FIG. 3 is a functional block diagram schematically illustrating the internal configuration of an image projection apparatus used in the present embodiment.

FIG. 1 is an explanatory view illustrating the schematic configuration of an image transmission system including an image transmission apparatus according to a first embodiment. FIG. 2 is a functional block diagram schematically illustrating the internal configuration of the image transmission apparatus according to the first embodiment. FIG. 3 is a functional block diagram schematically illustrating the internal configuration of an image projection apparatus used in the first embodiment.

An image transmission system 10 includes an image transmission apparatus 20 and an image projection apparatus 30. A plurality of image projection apparatuses 30 are connected to the image transmission apparatus 20. The image transmission apparatus 20 and the image projection apparatus 30 are connected to each other through a universal serial bus (USB) cable CV or a wireless local area network (LAN), for example.

Configuration of an Image Transmission Apparatus

The image transmission apparatus 20 is a personal computer, for example, and is connected with a display device 40 and an input device 41, such as a keyboard and a mouse. As shown in FIG. 2, the image transmission apparatus 20 includes a central processing unit (CPU) 200, a random access memory (RAM) 210, a hard disk drive (HDD) 220, a graphic memory (VRAM) 230, and an input/output interface 240. The CPU 200, the RAM 210, the HDD 220, the VRAM 230, and the input/output interface 240 are connected to one another through a common bus 250 such that two-way communications can be performed.

The CPU 200 is a logic circuit that executes various kinds of operation processing and, for example, loads various kinds of programs and modules, which are stored in the HDD 220, to the RAM 210 and executes the programs and modules. The RAM 210 is a volatile memory and temporarily stores an operation result of the CPU 200 and display image data to be transmitted to the image projection apparatus 30. The VRAM 230 is a memory for loading display image data drawn on the basis of data and temporarily buffering the loaded display image data. In general, reading and writing of data in the VRAM 230 can be performed in higher speed than in the RAM 210.

The HDD 220 is a magnetic disk type storage device that stores an image transmission program P1 therein. In addition, a nonvolatile semiconductor memory may be provided instead of the HDD 220. The image transmission program P1 stored in the HDD 220 includes a window selection module M1, a projector designation module M2, a storage control module M3, a display image data generating module M4, an image processing module M5, a communication control module M6, a projector information acquisition module M7, a connection projector managing module M8, and a display control module M9. In addition, the modules realize various kinds of functions when executed by the CPU 200.

The image transmission program P1 is a program for transmitting an image, which is displayed on the display device 40 connected to the image transmission apparatus 20, to an external image output apparatus. More specifically, the image transmission program P1 in the present embodiment can transmit a plurality of contents displayed on the display device 40 to each image output apparatus in a unit of content. Here, the content is a display screen provided in an application unit and includes each document preparation screen in word processor software, each presentation screen in presentation software, a reproduction screen on which moving picture content that is stream distributed is reproduced, and an edit screen and a display screen of a still image. In addition, a so-called desktop screen, which is displayed as a background of the display device 40, is also included in the content. In addition, since the content is called a window in the case when, for example, the Windows (registered trademark) is used as an operating system, the content will also be called a 'window'.

The window selection module M1 is a module executed to select a desired window from a plurality of windows displayed on the display device 40. Specifically, a window that an operator has selected from a plurality of windows through the input device 41 is specified. For example, by giving a unique number to a window (open window) displayed on the display device 40, it is possible to identify each window and to specify the selected window.

The projector designation module M2 is a module for designating a projector (image projection apparatus) 30 that outputs the window selected by the window selection module M1.

The storage control module M3 is a module for storing association between the selected window and the designated projector 30 in the RAM 210 or the HDD 220. Moreover, the storage control module M3 secures a window storage region (contents storage region) for storing display image data of a window on the RAM 210 in advance according to the number of windows at least parts of which are displayed on the display device 40, the number of projectors 30 connected to the image transmission apparatus 20, and the maximum resolution of the display device 40. In addition, at least one of a window storage region corresponding to the number of windows and a transmission storage region corresponding to the number of projectors 30 may be secured in the RAM 210 or the HDD 220.

The display image data generating module M4 is a module for generating display image data of each window displayed on the display device 40. The display image data generating module M4 can generate display image data for a window existing on the display device 40, that is, display image data for all windows including a window hidden in other windows and a window a part of which protrudes from a display screen of the display device 40 so as not to be displayed. This processing is realized by first drawing display image data for not only a window under operation (active window) but also other windows, for example, on the VRAM 230 at a selection point of time and storing the drawn display image data at a predetermined position of the RAM 210. In this case, display of other windows can be updated by executing drawing processing for the other windows whenever the other windows other than the active window are selected. Alternatively, in the case where the capacity of the VRAM 230 is large, display image data of a plurality of windows may be stored in the VRAM 230.

The image processing module M5 is a module for executing various kinds of image processing on display image data to be transmitted to the projector 30. Examples of image processing executed by the image processing module M5 include resolution conversion processing, sharpness, brightness adjustment, and color balancing. Furthermore, in the present embodiment, various kinds of operations on a layout display window displayed within a layout display region on the display device 40, for example, processing for changing display image data to be transmitted to the image projection apparatus 30 according to movement and change (resizing) is executed. Specifically, the projection position of an image projected by an image projection apparatus is moved in response to a movement operation on a layout display window, and the image projected by the image projection apparatus is resized in response to a resizing operation on the layout display window.

The communication control module M6 is a module which controls transmission of display image data to the projector 30 or controls the input/output interface 240 in order to receive projector information from the projector 30.

The projector information acquisition module M7 is a module for acquiring projector information I33 (refer to FIG. 3) from the projector 30. For example, the maximum resolution that a projector supports, a color profile (for example, ICC profile) of a projector, identification information for specifying a projector, and information on image reproduction characteristics of the other projectors are included in the projector information I33.

The connection projector managing module M8 is a module for managing the number of projectors 30 connected to the image transmission apparatus 20, that is, connection and disconnection of the projector 30 with respect to the image transmission apparatus 20.

The display control module M9 is a module for displaying an image on the display device 40 using display image data and displaying a layout display region and a layout display window in a predetermined region on the display device 40. In addition, the display control module M9 changes the display of a layout display window on the basis of an operation on the layout display window, for example, movement and change (resizing) of the layout display window. The display control module M9 also changes the size of a window displayed on the display device 40 in the case where the operation on the layout display window is changing (resizing). In addition, for a layout display window of a window a part of which protrudes from a screen of the display device 40, the display control module M9 displays a plurality of layout display regions and performs display over the plurality of layout display regions including the part protruding from the screen of the display device 40.

The input/output interface 240 exchanges signals between the image transmission apparatus 20 and an external apparatus, for example, the image projection apparatus 30 in a wireline or wireless manner. In the case of a wireline method, for example, a USB cable connection terminal is provided. In the case of a wireless method, for example, a transmission and reception portion including an antenna and a switch for switching of transmission and reception is provided. By the transmission and reception portion provided, a station (STA) function or an antenna access point (AP) function of transmitting and receiving transmission and reception signals is realized. Furthermore, the input/output interface 240 receives an input signal from the input device 41, such as a keyboard or a mouse, and outputs display image data to the display device 40.

Configuration of an Image Projection Apparatus

The image projection apparatus 30 is a projector, for example, as already described. As shown in FIG. 2, the projector 30 includes a central processing unit (CPU) 300, a random access memory (RAM) 310, a nonvolatile memory (ROM) 320, a graphic memory (VRAM) 330, an image display module 340, an optical system 350, and an input/output interface 360. The CPU 300, the RAM 310, the ROM 320, the VRAM 330, the image display module 340, and the input/output interface 360 are connected to one another through a common bus 370 such that two-way communications can be performed.

The CPU 300 is a logic circuit that executes various kinds of operation processing and, for example, loads various kinds of programs and modules, which are stored in the ROM 320, to the RAM 310 and executes the programs and modules. The RAM 310 is a volatile memory and temporarily stores an operation result of the CPU 300. The VRAM 330 is a memory for temporarily buffering graphic data drawn on the basis of the display image data.

The ROM 320 is semiconductor memory which stores a projector information transmission module M31, a drawing module M32, and the projector information I33. In addition, a magnetic disk type storage device may also be used instead of the ROM 320.

The projector information transmission module M31 is a module for transmitting projector information stored to the image transmission apparatus 20. For example, when either a wireline or wireless connection or combination thereof is made between the projector 30 and the image transmission apparatus 20, the projector information I33 stored is acquired and the projector information I33 is transmitted to the image transmission apparatus 20 through the input/output interface 360.

The drawing module M32 analyzes display image data, which has been received from the image transmission apparatus 20 through the input/output interface 360, and draws the display image data on the VRAM 330. Specifically, the drawing module M32 acquires information on the number of colors, size (length, width), coordinates, and an image format by analyzing the display image data received, and a pixel value is disposed on the VRAM 330 in a bit map method using the acquired information, for example.

The image display module 340 is used to generate a projected image by using the drawing data stored in the VRAM 330. For example, an image display portion that modulates light from an RGB light source using a liquid crystal panel and an image display portion that modulates the light using a digital micromirror device (DMD) may be used as the image display module 340.

The optical system 350 is configured to include a plurality of lenses and is used to project an image generated in the image display module 340 on a projection surface in a desired size.

Image Transmission Processing

Figure 4:
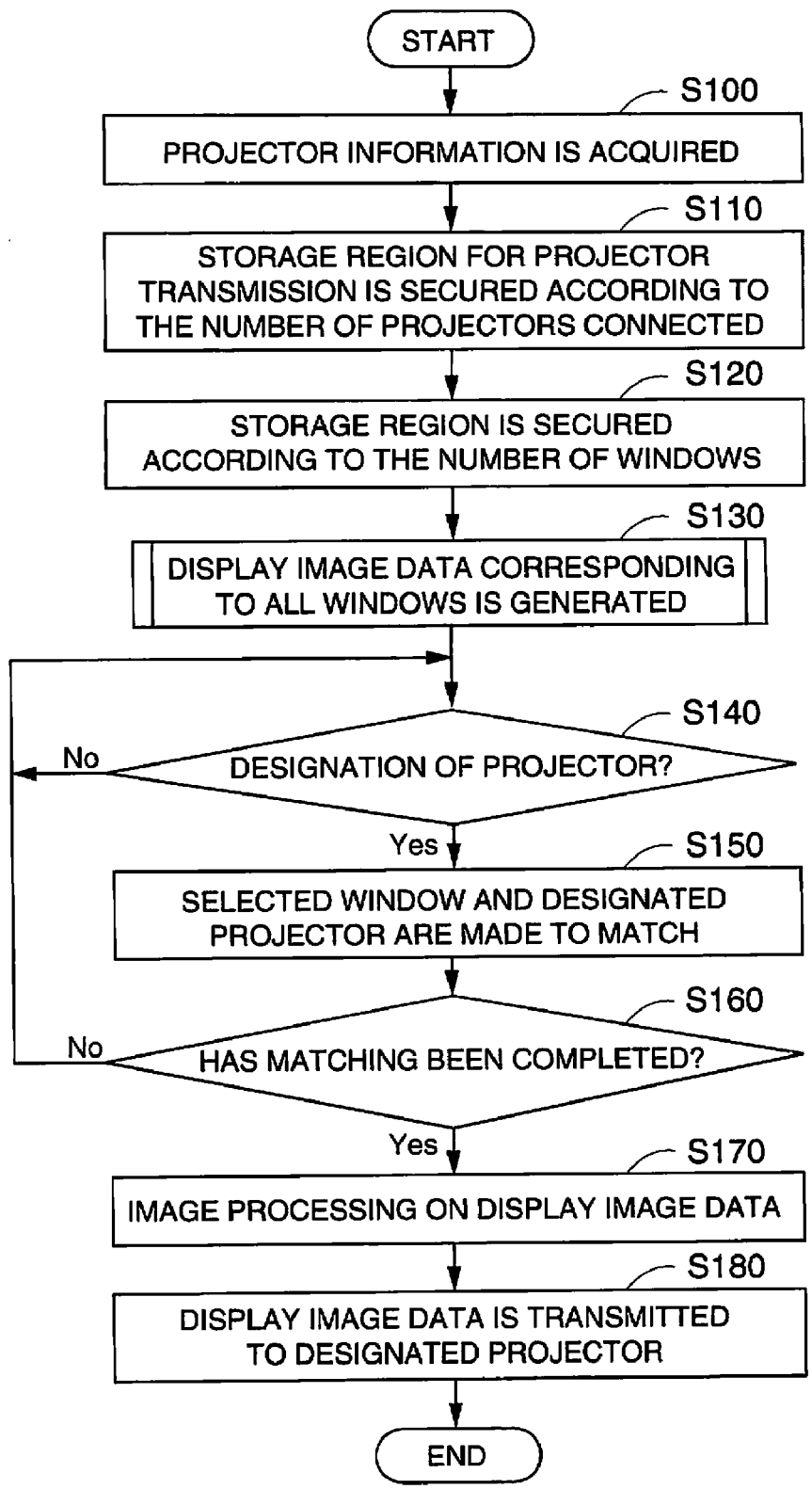
FIG. 4 is a flow chart illustrating a processing routine executed in image transmission processing executed by the image transmission apparatus according to the present embodiment.

Turning now to FIG. 4 and later in the specification to FIG. 9, methods of the disclosure, in accordance with various embodiments, are described in terms of firmware, software, and/or hardware with reference to flow charts or diagrams. Describing a method by reference to a flow chart enables one skilled in the art to develop programs, including instructions to carry out the methods on suitably configured computer systems and electronic devices. In various embodiments, portions of the operations to be performed by a computer device system may constitute circuits, general purpose processors (e.g., micro-processors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation, at least one of the processors of a suitably configured electronic communication device executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the computer to perform an action or a produce a result.

Figure 5:
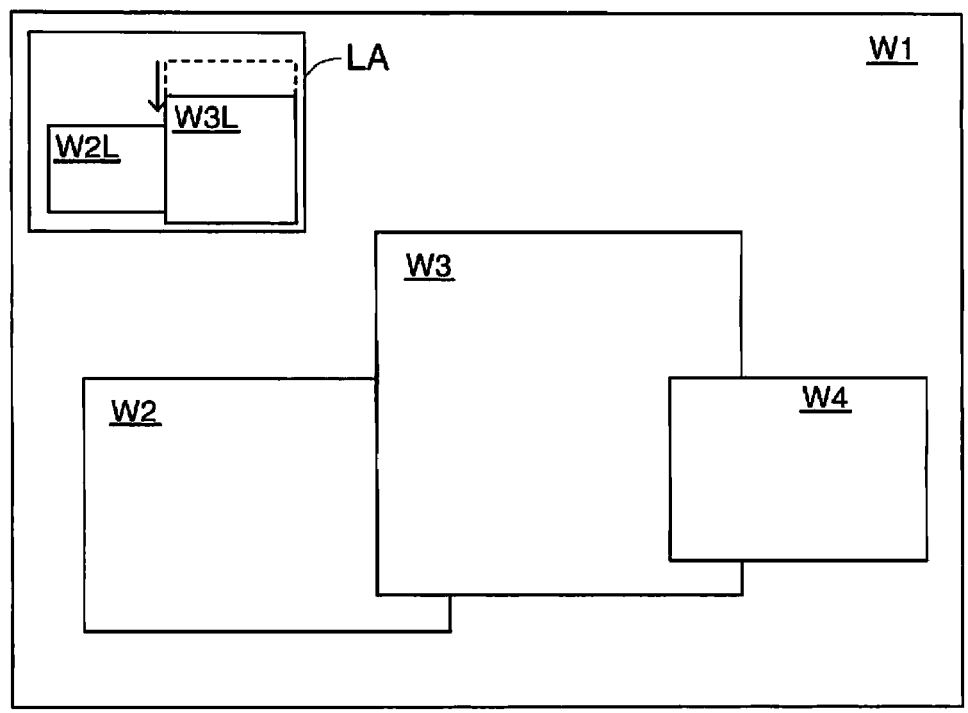
FIG. 5 is an explanatory view illustrating an example of a screen on a display device on which a plurality of windows are displayed.
Figure 6:
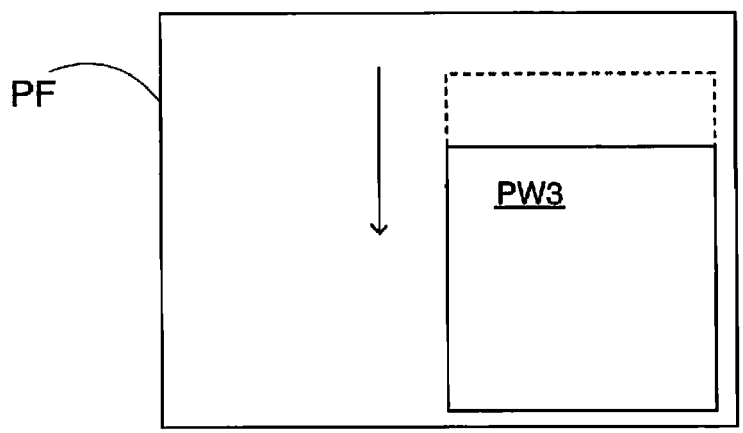
FIG. 6 is an explanatory view illustrating an example of a change of an image on a projector which corresponds to a window moved in FIG. 5.
Figures 7, 8:
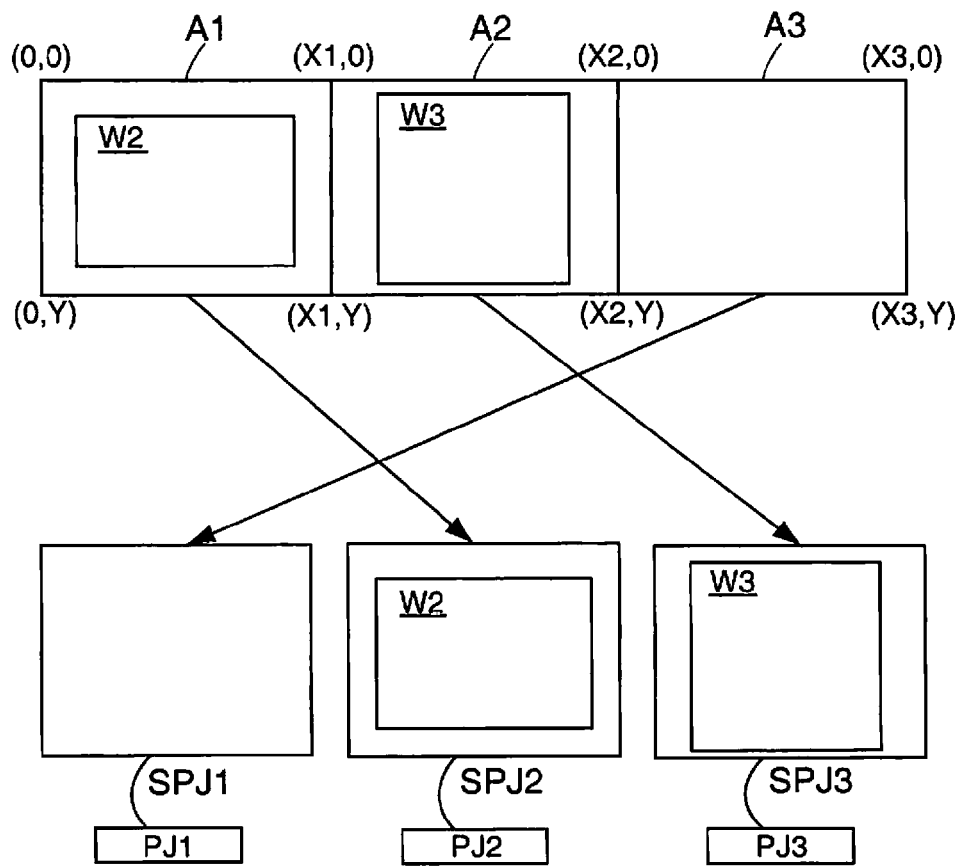
FIG. 7 is an explanatory view illustrating an example of the correspondence relationship between window storage regions, in which display image data is stored, and storage regions for projector transmission.
FIG. 8 is an explanatory view illustrating an example of a table where window storage regions in which display image data is stored, storage regions for projector transmission, and windows correspond to each other.

FIG. 4 is a flow chart illustrating a processing routine executed in image transmission processing executed by the image transmission apparatus according to the first embodiment. FIG. 5 is an explanatory view illustrating an example of a screen on a display device on which a plurality of windows are displayed. FIG. 6 is an explanatory view illustrating an example of a change of an image on a projector which corresponds to a window moved in FIG. 5. FIG. 7 is an explanatory view illustrating an example of the correspondence relationship between window storage regions A1 to A3, in which display image data is stored, and storage regions SPJ1 to SPJ3 for projector transmission. FIG. 8 is an explanatory view illustrating an example of a table where the window storage regions A1 to A3 in which display image data is stored, the storage regions SPJ1 to SPJ3 for projector transmission, and windows W1 to W3 correspond to each other.

This processing routine is started by starting of an image transmission application, for example. The CPU 200 executes the projector information acquisition module M7 to acquire the projector information I33 from each projector 30 connected to the image transmission apparatus 20 (step S100). Specifically, the CPU 200 transmits a request to transmit projector information to each cable port and each wireless port and transmits a request to transmit projector information to each projector 30 connected. In each projector 30 that receives the request of projector information transmission, the CPU 300 executes the projector information transmission module M31 to acquire the projector information I33 from the ROM 320 and transmits the projector information I33 to the image transmission apparatus 20. The CPU 200 which has received the projector information stores the maximum resolution supported by each projector 30, a color profile, identification information, and other image reproduction characteristics in the HDD 220 so as to match each projector 30 by using projector information acquired from each projector 30.

The CPU 200 executes the connection projector managing module M8 to specify the number of projectors 30 connected to the input/output interface 240 and executes the storage control module M3 to secure storage regions for projector transmission, which correspond to the number of projectors 30 connected, in the RAM 210 or the HDD 220 (step S110). In the example shown in FIG. 7, the storage regions SPJ1 to SPJ3 for projector transmission are secured (assigned) for the projectors PJ1 to PJ3, respectively. Specification of the number of projectors 30 is realized when the CPU 200 detects the number of cable and wireless ports, which are connected to the projector 30, on the basis of detection of a voltage change of a power supply terminal for detection in a USB terminal and detection of connection establishment in wireless communications, for example. In addition, unlike the window storage regions A1 to A3 where display image data is stored, the storage regions SPJ1 to SPJ3 for projector transmission may not necessarily be continuous. In addition, the capacity corresponding to the resolution of primary display (desktop screen) of the display device 40 is secured in the storage regions SPJ1 to SPJ3 for projector transmission.

The CPU 200 executes the storage control module M3 to secure the window storage region corresponding to the number of windows in the RAM 210 (step S120). For example, in the case of Windows (registered trademark), each window is managed by using a number called a handle and handles of all windows displayed (opened) on the display device 40 can be acquired when the CPU 200 executes an API function 'EnumWindows'. Accordingly, the CPU 200 secures a plurality of window storage regions, which are required to store all windows, in the RAM 210 according to the acquired number of handles. In addition, for the capacity of each window storage region, a capacity corresponding to the resolution of a desktop screen (primary display) of the display device 40 is secured.

The CPU 200 executes the display image data generating module M4 to generate (capture) display image data for all windows displayed on the display device 40 (step S130). In the example shown in FIG. 5, three windows W2 to W4 are displayed on the display device 40 in addition to a desktop window W1. The three windows W2 to W4 may be called contents provided by applications. In addition, in the case where a part of window protrudes from the display device 40, the protruding portion is not displayed on the display device 40 but display image data of the whole window including the protruding portion is generated. In addition, cases of the protruding portion include both cases of a case, in which the position of a window is offset, and a case in which the whole window is not included in the display device 40. In the former case, display image data generated can be stored in one window storage region. In the latter case, however, the display image data generated is stored in a plurality of window storage regions.

For example, in the case where an operating system is Windows (registered trademark), display image data corresponding to all windows displayed on the display device 40 is generated by forming layered windows. Using a handle of each window acquired previously, the CPU 200 forms each window as a layered window by sequentially executing 'GetWindowLong' which is an API function for acquiring a set value of a current window, 'SetWindowLong' which is an API function for making registration by OR between a current window style acquired in 'GetWindowLong' and layered setting API 'WS_EX_LAYERED', and an API function 'SetLayeredWindowAttributes' for setting a layered parameter of a designated window. For each window formed as a layered window, the entire window is captured, that is, display image data corresponding to the whole window is generated.

The display image data generating module M4 generates display image data by loading (drawing) display image data onto the VRAM 230 on the basis of application data corresponding to each window. Each of the display image data generated is transmitted and stored in a window storage region previously secured in the RAM 210 in a sequential manner. In FIG. 7, display image data of the window W2 is stored in the first window storage region A1, and display image data of the window W3 is stored in the second window storage region A2. In the present embodiment, the storage control module M3 manages the window storage regions A1 to A3 by using coordinates (X, Y) and, for example, the position of a window (display image data) on a display screen of the display device 40 is managed by using upper left coordinates as a reference. In addition, the projection position of an image with respect to a projection frame when projected corresponds to a storage location of display image data stored in each window storage region, and the position of an image projected can be specified by specifying the coordinates in each window storage region. In addition, pixel data that forms display image data can also be specified by using the coordinates applied to the window storage region.

The CPU 200 executes the projector designation module M2 to wait for a user to designate the projector 30 (step S140: No). For example, designation of the projector 30 can be realized by listing all windows existing on the display device 40 and matching each window with a projector through the input device 41 or by displaying a button for projector selection on a title bar of a window and designating a desired projector from a displayed projector selection menu by pressing of a button.

When the projector 30 associated with one window is designated (step S140: Yes), the CPU 200 executes the storage control module M3 to match the designated projector 30 with the selected window (step S140). Specifically, the CPU 200 executes the storage control module M3 to match a window storage region, in which display image data corresponding to the selected window is stored, with a storage region for projector transmission corresponding to the designated projector. Matching between the selected window and the designated projector is executed until an input of matching completion is input by a user through the input device 41, until all windows correspond to projectors, or until all projectors correspond to windows (step S160: No).

In the examples shown in FIGS. 7 and 8, display image data of the window W2 is stored in the first window storage region A1 where display image data is stored, and display image data of the window W3 is stored in the second window storage region A2. In addition, the first projector PJ1 and the window W1 are matched, the second projector PJ2 and the window W2 are matched, and the third projector PJ3 and the third window W3 are matched.

The CPU 200 executes the storage control module M3 to copy or move display image data of the window W2, which is stored in the first window storage region A1, to the storage region SPJ2 for projector transmission which is a transmission storage region corresponding to the second projector PJ2. Similarly, display image data of the window W3 stored in the second window storage region A2 is copied or moved to the storage region SPJ3 for projector transmission. Matching between each of the projectors PJ1 to PJ3 and each storage region can be realized, for example, by matching a port number, to which each of the projectors PJ1 to PJ3 is connected, or a MAC address of each of the projectors PJ1 to PJ3 (communication control module) with coordinate information that defines each storage region.

When matching between the selected window and the designated projector is completed (step S160: Yes), the CPU 200 executes the image processing module M5 to execute image processing for display image data as occasion demands (step S170). In the present embodiment, image processing for display image data is executed in each of the storage regions PJS1 to PJS3 for projector transmission. In image processing, for example, resolution conversion processing, sharpness, brightness adjustment, image quality adjustment processing called color balancing, and mixing processing for display image data, all of which uses projector information, are executed. By the mixing processing, display image data according to an image displayed on the display device 40 can be transmitted to the projector 30 when it is requested to project a plurality of windows onto one projector.

The CPU 200 executes the communication control module M6 to transmit display image data, which has been subjected to image processing and which is stored in each of the storage regions SPJ1 to SPJ3 for projector transmission, to each of the corresponding projectors PJ1 to PJ3 (step S180), completing the processing routine. In addition, after matching between the window and the projector 30 is completed, generation of display image data of a window on the display device 40 and transmission of the display image data to each projector 30 (PJ1 to PJ4) are repeatedly executed at predetermined timing. Alternatively, in the case where the content is a content without a time change, generation of display image data of a corresponding window and transmission of the display image data to each projector 30 (PJ1 to PJ4) may also be performed at timing when a window became active. As a result, even after a window and the projector 30 are matched, an image corresponding to a newest window can always be projected.

Layout Operation

Figure 9:
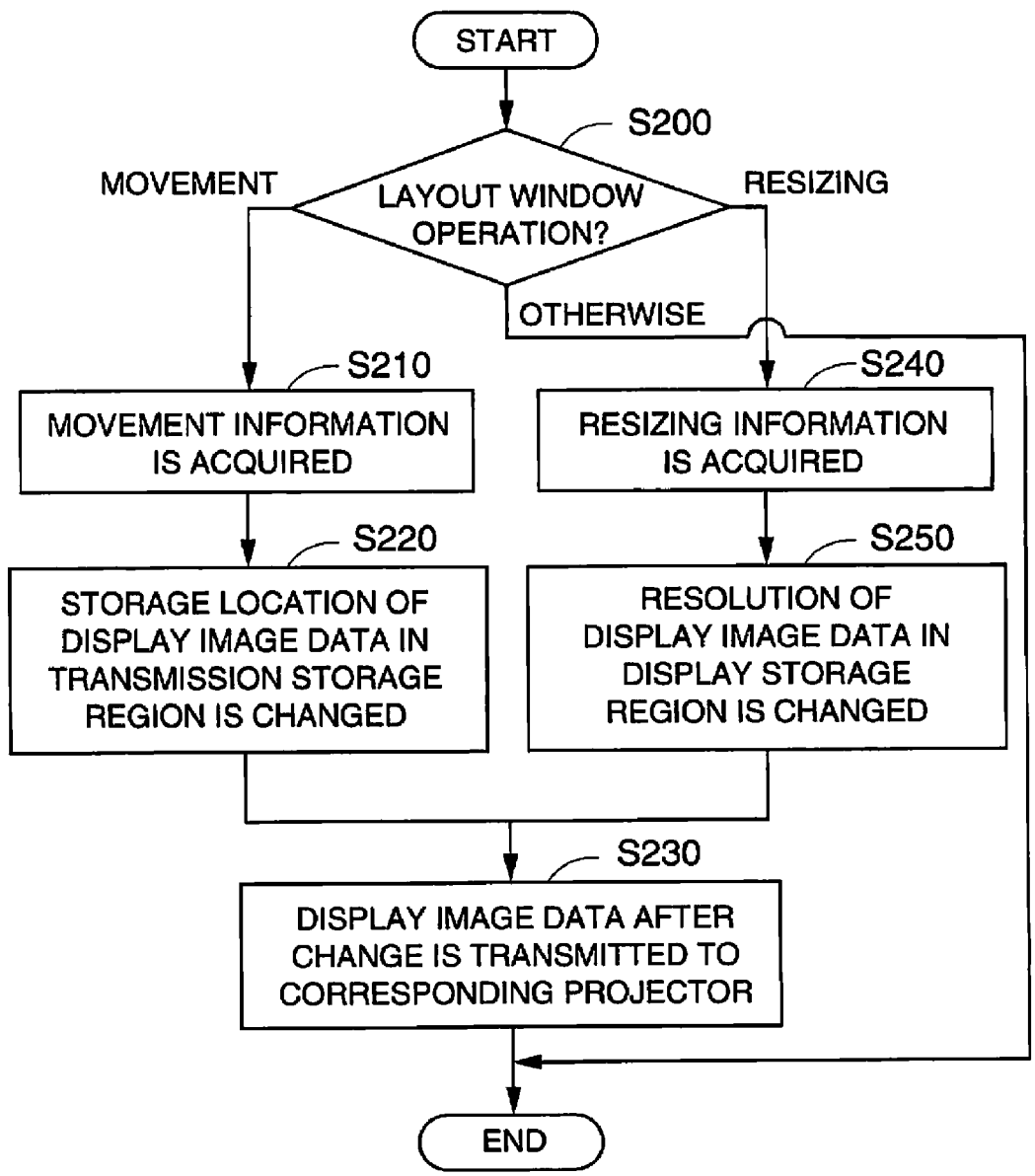
FIG. 9 is a flow chart illustrating a processing routine executed in response to a layout operation in the present embodiment.

FIG. 9 is a flow chart illustrating a processing routine executed for a layout operation. As shown in FIG. 5, the image transmission apparatus 20 according to the present embodiment includes a layout display region LA in order to display the layout of a window transmitted to the projector 30 on a primary screen of the display device 40, that is, generally on a desktop screen. Either display or non-display of the layout display region LA is selected by a user by means of a selection button disposed on a primary screen or a title bar of each window, for example. When the display is selected by the user, the CPU 200 executes the display control module M9 to display a rectangular frame line for partitioning the layout display region LA on an upper left side of the primary screen, for example. It is preferable that the aspect ratio of the layout display region LA be the same as that of the primary screen. The display control module M9 displays a layout display window, which shows the layout of a window that has been transmitted to the projector 30 or will be transmitted to the projector 30 from now, in the layout display region LA. Here, the layout of a window means a layout on a projection surface of an image projected by the projector 30, for example, the position and size of a projected image with respect to the projection frame that can be projected by the projector 30.

In the example shown in FIGS. 5 and 7, display image data of the windows W2 and W3 among the windows displayed on the display device 40 is transmitted to the projector 30. Accordingly, only layout display windows W2L and W3L corresponding to the windows W2 and W3 are displayed in the layout display region LA. The sizes of the layout display windows W2L and W3L are reduced in a predetermined ratio according to the sizes of the windows W2 and W3, and the positions of the layout display windows W2L and W3L correspond to projection positions of projected images using display image data of the windows W2 and W3 with respect to the projection frame. In addition, the layout display windows W2L and W3L do not need to display the contents of the corresponding windows W2 and W3 but may be displayed as frames or empty windows, for example.

The display control module M9 performs resolution conversion according to a reduced scale set beforehand by using display image data stored in the window storage region and calculates the display coordinate position on the primary screen corresponding to a display coordinate position within the layout display region LA by using coordinate information given to the display image data. The display control module M9 draws a layout display window in the VRAM 230 by using the calculated coordinate position information and frame data of the display image data in which resolution has been converted. In addition, layout display windows may also be displayed in the layout display region LA so as to overlap each other.

For the layout display window, operations, such as resizing and movement, may be performed through the input device 41, such as a mouse or a keyboard. These operations are also reflected on a projected image projected through the projector 30. The CPU 200 starts layout display change processing shown in FIG. 9 when an operation on a layout display window is detected.

When it is determined that the operation on the layout display window is movement processing shown in FIG. 5 (step S200: movement), the CPU 200 acquires information on the movement (step S210) and changes the storage location of display image data in the storage region for projector transmission (step S220). FIG. 5 shows an example in which the layout display window W3L has moved in the arrow direction from the original position indicated by a dotted line. The information on movement is movement amounts (movement distances) of a layout display window in X and Y directions in the layout display region LA, for example. The CPU 200 calculates the movement amounts of display image data in the X and Y directions in a storage region and changes X and Y coordinates of all pixel data that forms the display image data by using the acquired information on movement and information on the resolution of the display image data.

The CPU 200 transmits the changed display image data to the projector 30 that matches a transmission storage region (step S230), completing the processing routine. As a result, as shown in FIG. 6, the display position of the image PW3, which is projected by the projector 30, with respect to a projection frame PF of the projector 30 is changed. In addition, it is preferable that the corresponding window on the display device 40 do not move even if a layout display window in the layout display region LA moves. Movement of a display window in the layout display region LA is processing for changing the projection position of an image projected by the projector 30. The movement of a display window in the layout display region LA is little relevant to the display position of a corresponding window on the display device 40 since movement of a corresponding window on the display device 40 may interrupt other processing that is processing of contents with respect to the corresponding window. For example, even in the case when other windows are moved by an operation in the layout display region LA in order to perform predetermined processing for one window on the display device 40 on which a plurality of windows are displayed, unnecessary fluctuation of a projected window can be prevented or suppressed without changing the projection positions of other windows by the projector 30.

In addition, in the case when an operation causing a layout display window to protrude from the layout display region LA is executed by a movement operation, the layout display window may be displayed to protrude from the layout display region LA or may be displayed to stop in the layout display region LA by executing coordinate calculation. Moreover, in the former case, in image processing (storage location change processing) performed on display image data for projector transmission in response to the operation protruding from the layout display region LA, the storage location may be changed such that a projection position does not protrude from a projection frame or the storage location may be changed such that the projection position protrudes from the projection frame. In the present embodiment, the display image data is generated for all windows so as to meet any case. On the other hand, in the latter case, in the image processing (storage location change processing) performed on display image data for projector transmission in response to the operation protruding from the layout display region LA, the storage location is changed such that the projection position does not protrude from the projection frame. Such processing on the movement operation is preferably processing that may be properly selected by a user.

Figure 10:
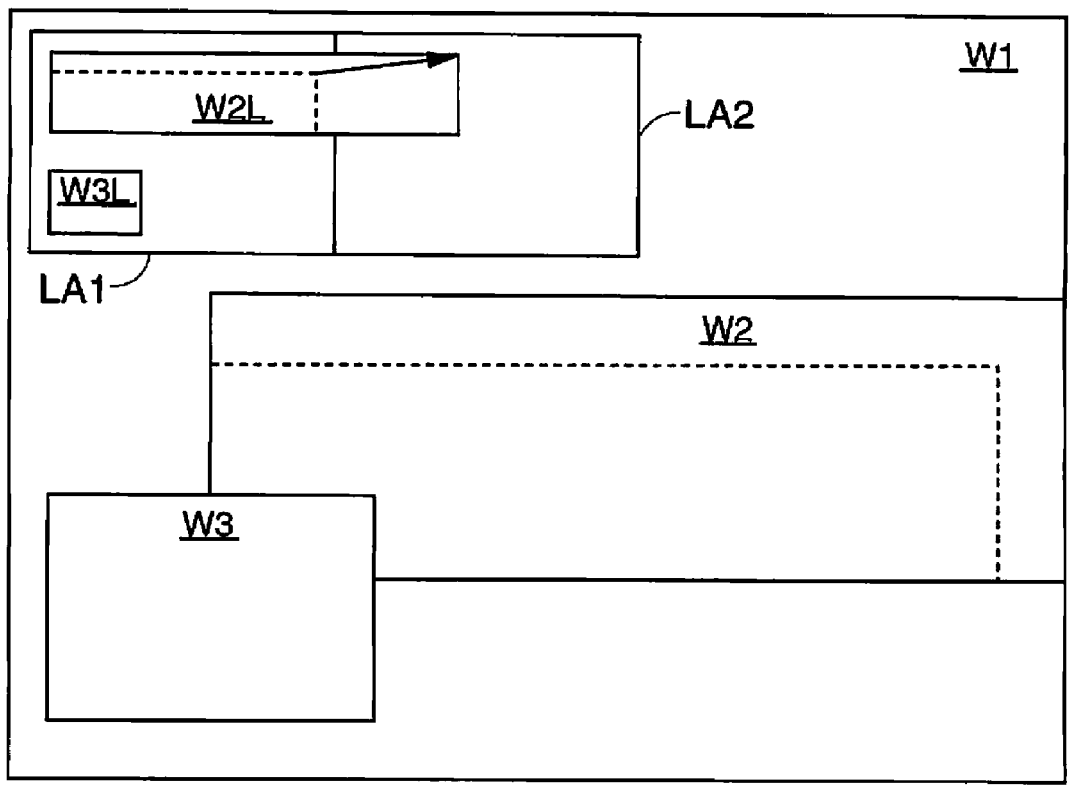
FIG. 10 is an explanatory view illustrating another example of a screen on a display device on which a plurality of windows are displayed.
Figure 11:
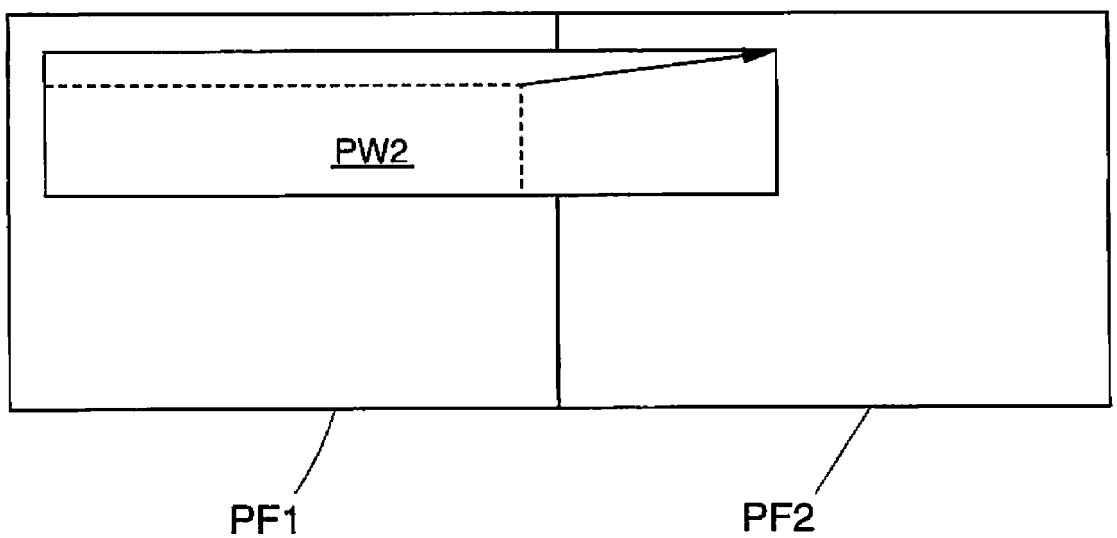
FIG. 11 is an explanatory view illustrating an example of a change of an image on a projector which corresponds to a window resized in FIG. 10.
Figures 12, 13:
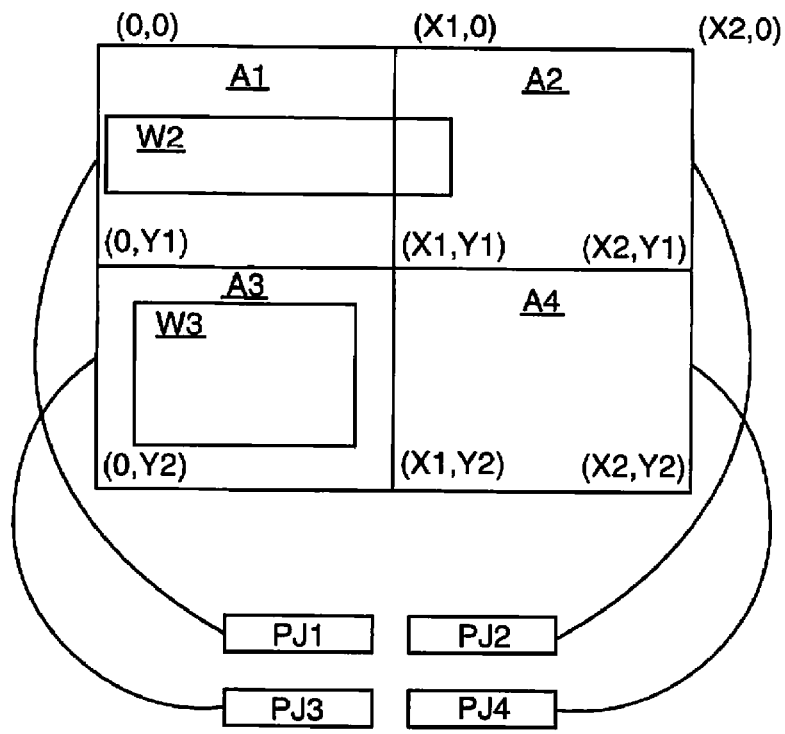
FIG. 12 is an explanatory view schematically illustrating a memory area of a RAM in which display image data of each window shown in FIG. 10 is stored.
FIG. 13 is an explanatory view illustrating an example of a table in which the correspondence relationship between a projector and a window is stored.

Hereinafter, a case where an operation on a layout display window is resizing processing will be described. FIG. 10 is an explanatory view illustrating another example of a screen on a display device on which a plurality of windows are displayed. FIG. 11 is an explanatory view illustrating an example of a change of an image on a projector which corresponds to a window resized in FIG. 10. FIG. 12 is an explanatory view schematically illustrating a memory area of the RAM in which display image data of each window shown in FIG. 10 is stored. FIG. 13 is an explanatory view illustrating an example of a table in which the correspondence relationship between a projector and a window is stored.

On the other hand, when it is determined that the operation on the layout display window is resizing processing (step S200: resizing), the CPU 200 acquires information on the resizing (step S240) and changes the resolution (projection size) of display image data in a display storage region (step S250). The information on resizing is a ratio of horizontal and vertical size of a layout display window in the layout display region LA after change with respect to horizontal and vertical size thereof before change, for example. The CPU 200 converts the resolution of display image data in a storage region by using the acquired resizing information.

The CPU 200 transmits the display image data to a transmission storage region that matches a display storage region and transmits the changed display image data to the projector 30 that matches the transmission storage region (step S230), completing the processing routine. As a result, as shown in FIG. 11, the size of an image PW2 projected by the projector 30 is changed. In the example shown in FIG. 11, the whole layout display window W2L is projected by two projectors 30 since the maximum size of the primary screen is exceeded by the size change of a layout display window to be described later. That is, a part of the image PW2 is projected onto a projection frame PF1 of the first projector and the rest of the image PW2 is projected onto a projection frame PF2 of the second projector. In addition, the size of a corresponding window on the display device 40 may be changed according to the size change of a layout display window on the layout display region LA. Even though resizing of a display window in the layout display region LA is processing a first object of which is to change the size of an image projected by the projector 30, the size change of a projected image may show high relevance in processing called a change of content with respect to a corresponding window on the display device 40, which allows processing on a corresponding window to be smoothly performed.

In addition, since the resolution of display image data in the display storage region is changed, resized display image data is used in processing using display image data stored in the same display storage region, for example, at the time of reading corresponding display image data according to a change in an active window on the display device 40. As a result, the size of a corresponding window on the display device 40 is also changed easily according to the size change of the layout display window in the layout display region LA.

Here, the maximum size of an image displayed on the display device 40 is generally limited to the size of the primary screen. Accordingly, usually, the maximum size of the layout display window in the layout display region LA could not exceed the layout display region LA or the zoom magnification provided by the projector 30. In the present embodiment, however, resizing exceeding the size (resolution) of the primary screen is allowed as will be described below. In addition, since a technique of changing the window size is a technique known to one skilled in the art, the technique will be described briefly.

In the example shown in FIG. 10, the layout display window W2L in the layout display region LA is changed to have a size protruding from a layout display region LA1 by a user's operation of enlarging the size in the arrow direction from the original size shown by a dotted line. In the case where the layout display window protrudes from the layout display region LA1 by user's resizing operation, the CPU 200 (display control module M9) displays a new layout display region LA2 in the direction extended by the resizing operation and displays the whole layout display window after resizing by the plurality of layout display regions LA1 and LA2. In addition, in the case where the size of the layout display window displayed by the plurality of layout display regions LA1 and LA2 is reduced, the number of layout display regions LA is suitably reduced in a range where the whole layout display window can be displayed. As a result of the resizing operation on the layout display window W2L in the layout display region LA, the size of the window W2 is changed into a size exceeding the size of the primary screen by the user, such that the whole window W2 is not included in the display device 40 but a part of the window W2 protrudes from the display screen of the display device 40 so as to be invisible.

The size change of a window on a primary screen is controlled by an operating system (OS). When a change of the window size with respect to an application program (window) is requested by the user, the OS transmits WM_GETMINMAXINFO, which is an API message, to the application program. WM_GETMINMAXINFO is a pointer indicating the MINMAXINFO structure. Information on the size and position of a window at the time of maximization and information on the tracking size at the time of maximization and iconization are stored in the MINMAXINFO structure. Usually, an application program which has received WM_GETMINMAXINFO returns a value, which is set as a default in the MINMAXINFO structure, to the OS without changing a default value. On the other hand, in the present embodiment, the image processing module M5 acquires a size change value of the layout display window W2L, the size of which has been changed in the layout display region LA, and changes the width (ptMaxTrackSize.x) and height (ptMaxTrackSize.y) of maximum tracking of a window. As a result, since the OS allows a maximum value (x, y) set as a maximum value of the window size on the display device 40, the display control module M9 can change the size of a window in the layout display region LA exceeding the limitation (default value).

Furthermore, in the present embodiment, display image data showing the whole window is generated for a window where at least a part is displayed on the display device 40, as described above. As a result, the display image data of the window W2 resized to exceed the size of the primary screen is stored in the first and second storage regions A1 and A2, as shown in FIG. 12. In the example shown in FIGS. 10 and 12, the first storage region A1, the second storage region A2, the third storage region A3, and the fourth storage region A4 corresponds to the first projector PJ1, the second projector PJ2, the third projector PJ3, and the fourth projector PJ4, respectively. Accordingly, a part of the window W2 stored in the first storage region A1 corresponds to the first projector PJ1, the rest of the window W2 stored in the second storage region A2 corresponds to the second projector PJ2, and the window W3 stored in the third storage region A3 corresponds to the third projector PJ3.

In the present embodiment, a horizontal or vertical side of each storage region completely touches an adjacent storage region, that is, a horizontal or vertical side of each storage region is secured to be continuous, such that it is possible to form one virtual storage region for storing display image data corresponding to one window by a plurality of adjacent storage regions. In addition, since the arrangement of storage regions is secured to correspond to the arrangement of the projectors PJ1 to PJ4, projection of an image based on a loaded image of display image data on each storage region becomes possible. That is, display image data of the window W2 stored in the first storage region A1 is projected by the first projector PJ1, and display image data of the window W2 stored in the second storage region A2 is projected by the second projector PJ2. Accordingly, the entire image of the window W2 that cannot be projected in one projector 30 can be projected as one image PW2 onto a projected surface by the two projectors PJ1 and PJ2, as shown in FIG. 11. In addition, each storage region is managed by using coordinate information. Accordingly, even in the case where a storage region where a part of the window W2 is stored and a storage region where the rest of the window W2 is stored are not adjacent to each other, an image of the whole window W2 can be projected by transmitting display image data, which corresponds to the part of the window W2, and display image data, which corresponds to the rest of the window W2, to the projectors 30 disposed adjacent to each other, respectively.

In addition, since an image exceeding the primary screen cannot be displayed on the display device 40, only an image based on display image data stored in any one of the first and second storage regions A1 and A2 is displayed on the display device 40.

As another window operation in the layout display region LA, an operation of changing the display order (overlapping order) of layout display windows is possible. In this operation, the display order of layout display windows is changed, for example, by inputting a left clicking input (selection input) of a mouse on a desired layout display window or by changing the order in a display order list of a layout display window displayed in the layout display region LA.

The display order of the layout display window in the layout display region LA may be reflected in the display order of windows displayed on the display device 40 or may not be reflected. In the case where the display order is reflected, it becomes possible to select an active window by a selection operation in the layout display region LA and accordingly, selection of an active window in the display device 40 can be simplified.

As described above, according to the image transmission apparatus 20 according to the present embodiment, the layout display region LA which displays a layout display window corresponding to the layout at the time of projection of display image data transmitted to each projector 30 is present on the display device 40. Accordingly, the layout of an image projected by each projector 30 can be easily checked.

According to the image transmission apparatus 20 according to the present embodiment, the layout of an image displayed by each projector 30 can be changed by an operation on a layout display window in the layout display region LA. For example, the size and display position (position of projection onto a projection frame) of an image displayed by each projector 30 can be changed by an operation of resizing or moving the layout display window in the layout display region LA. Accordingly, the layout of an image projected by the plurality of projectors 30 can be managed or modified through one screen. Particularly in the case where a plurality of windows can be projected separately through the plurality of projectors 30 by one image transmission apparatus 20, it becomes possible to manage the projection layout of a window displayed on the display device 40 in an integrated manner. As a result, the convenience can be improved.

In the present embodiment, in the case where the size of a window on the display device 40 is changed, display image data the size of which size has been changed at next capture timing is generated and transmitted to the projector 30, and the display size of a layout display window in the layout display region LA is changed. That is, the size of a display image of a layout display window in the layout display region LA and the size of an image projected by the projector 30 are changed by an operation of changing the size of a window displayed on the display device 40. On the other hand, in the case where only the position of a window on the display device 40 is changed, the coordinate position of display image data in a storage region may not be changed from an initial coordinate position (attaching position). In this case, the projection position of an image projected by the projector 30 and the display position of a layout display window in the layout display region LA are not changed.

Furthermore, in the image transmission apparatus 20 according to the present embodiment, resizing can be executed exceeding the size of the primary screen of the display device 40. Accordingly, the size of a projected image can be easily changed to a desired size using a plurality of projectors disposed adjacent to each other without being limited by the size of the primary screen.

Furthermore, according to the image transmission apparatus 20 according to the present embodiment, an active window can be selected for a window displayed on the display device 40 in the layout display region LA. Accordingly, since it becomes possible to select an active window from only windows corresponding to the image projected by the projector 30, selection of an active window can be easily performed.

Furthermore, according to the image transmission apparatus 20 according to the present embodiment, it is possible to transmit a plurality of windows to the plurality of projectors 30, to project the plurality of windows through the projectors 30, and to easily manage and modify the layout without installing special driver software for projectors 30 in a personal computer or the like.

According to the image transmission apparatus 20 according to the present embodiment, image processing on display image data transmitted to the projector 30 can be executed while holding captured display image data. That is, in the image transmission apparatus 20 according to the present embodiment, two storage regions of a display storage region and a storage region for projector transmission are included. Accordingly, by executing image processing in the storage region for projector transmission, display image data on which image processing has been performed can be transmitted to the projector 30 without changing original display image data.

Furthermore, according to the image transmission apparatus 20 according to the present embodiment, a state of the primary display on the display device 40 can be easily projected. That is, in the present embodiment, display image data including all windows is obtained by mixing processing since display image data of each window is generated separately. Here, in the present embodiment, display image data corresponding to each window stored in a display storage region can be easily mixed by using a storage region for projector transmission.

Other Embodiments (1) In the above embodiment, an example in which a display storage region and a storage region for projector transmission are secured on the RAM 210 has been described; however, either the display storage region or the storage region for projector transmission may be used. In the case where only the display storage region is used, a desired window can be projected onto each projector by causing each display storage region to correspond to each projector 30. In this case, the display storage region is secured as many as windows displayed on the display device 40 in the RAM 210, and image processing including resizing and movement with respect to display image data in the display storage region is executed. In addition, in the case where display image data of the same window is transmitted to the plurality of projectors 30, the plurality of projectors 30 correspond to one display storage region. In matching each display storage region with each projector 30, for example, it is preferable to first generate display image data of all windows displayed on the display device 40 and to store corresponding display image data in a display storage region according to matching between each window and each projector 30. In this case, since the display image data of all windows displayed on the display device 40 is generated beforehand, corresponding display image data can be immediately transmitted to the projector 30 even when matching between a window and the projector 30 is changed.

In the case where only the storage region for projector transmission is used, a desired window can be projected onto each projector by causing each storage region for projector transmission to correspond to each projector 30. In this case, the storage region for projector transmission is secured as many as the projectors 30 connected to the image transmission apparatus 20 in the RAM 210, and image processing including resizing and movement with respect to display image data in the storage region for projector transmission is executed. In addition, also in the case where display image data of the same window is transmitted to the plurality of projectors 30, the display image data of the same window is stored in each storage region for projector transmission. In matching each storage region for projector transmission with a window, the storage region for projector transmission can be effectively used even in the case where the number of windows displayed on the display device 40 is different from the number of projectors connected, for example, by generating corresponding display image data when a window to be transmitted to each projector 30 is selected and storing the generated display image data in a storage region for projector transmission.

Furthermore, in the case where only a storage region for projector transmission is used, the capacity of a storage region in which display image data is stored may be reduced. That is, since display image data is generated sequentially for selected windows, display image data corresponding to a window that is not selected may not be generated. Furthermore, in this case, only display image data of a window transmitted to the projector 30 is generated and a storage region is released after transmission. Accordingly, the capacity of a storage region may be reduced. In addition, generation of display image data of a window is preferably executed again in the case where the same window needs to be captured.

(2) In the above embodiment, selection of a window may be executed when a desired window (content) is selected with a mouse (for example, left clicking) or when a mouse cursor moves to a desired window, for example. In this case, the user can select a window easily.

(3) In the above embodiment, the generated display image data may be repeatedly updated at predetermined timing. Consistency of an image projected through the projector 30 and a window on the display device 40 can be improved by updating. In addition, display image data may be generated (captured) at timing when a window becomes active. In this case, unnecessary updating of display image data can be suppressed. In addition, in the case where a window, that is, content, is related to a moving picture, the update timing may be short timing compared with a case of other contents. In addition, in order to reduce the amount of data transmitted, only difference data may be transmitted.

(4) In the above embodiment, image processing is executed in a storage region for projector transmission in the case of an operation of moving a layout display window in the layout display region LA, and the image processing is executed in a display storage region in the case of an operation of resizing a layout display window. However, the image processing may be executed in the display storage region and the storage region for projector transmission in the respective cases.

(5) In each embodiment described above, in the case where the capacity of a storage region of display image data with respect to a window or the projector 30 or the capacity of a storage region for projector transmission is not sufficient, the storage region capacity corresponding to the resolution lower than that of the primary display may be secured or the storage region capacity corresponding to the resolution of the primary display may be secured until the capacity is not sufficient. In the former case, display image data in which resolution conversion has been performed is preferably stored. In the latter case, display image data stored in each storage region is preferably switched sequentially.

(6) In each embodiment described above, a projector has been used as the image projection apparatus 30. However, a projection type display monitor may be used, for example. Furthermore, a normal display device may also be used instead of the image projection apparatus. Also in this case, a different window may be displayed for every display device.

(7) In each embodiment described above, the image transmission processing has been realized by software. However, the image transmission processing may be realized by hardware. In this case, the hardware may be realized as a substrate including a logic circuit for executing image transmission processing or a substrate including a logic circuit and a storage device, for example.

The preceding description, describing the embodiments and modifications of the disclosure, has been presented only to illustrate and describe the various embodiments of the disclosure with reference to the accompanying drawings, but does not limit the scope of the disclosure. It will, however, be evident that various modifications, changes, and improvements may be made, and additional embodiments may be implemented, without departing from the spirit and scope of the disclosure as defined in the appended claims, and the equivalents are expressly included in the spirit and scope of the disclosure. The above description and accompanying drawings are accordingly to be regarded in an illustrative rather than a restrictive sense.

What is claimed is:

1. An image transmission apparatus to which a plurality of image projection apparatuses are connectable, comprising:
   a display device configured to display a plurality of content elements;
   a display image data generator configured to generate display image data of each content element, at least a part of which is displayed on the display device;
   a storage device configured to store the display image data in a storage location corresponding to a projection position of an image projected by each of the connected image projection apparatuses;
   a storage controller configured to store the correspondence relationship between each of the connected image projection apparatuses and each of the generated display image data in the storage device;
   a transmitter configured to transmit each of the corresponding display image data to each of the connected image projection apparatuses; and
   a display controller configured to:
      display a plurality of primary display images on a primary screen of the display device using the display image data,
      display a plurality of layout display images corresponding to the plurality of primary display images in a layout display region on the display device, the layout display region occupying an area smaller than the primary screen, and
      change the layout of the plurality of layout display images in the layout display region independently of the plurality of primary display images in response to an operation of changing the layout of the plurality of layout display images;
   wherein projected images displayed by the connected image projection apparatuses are displayed in accordance with the layout of the plurality of layout display images in the layout display region.

2. The image transmission apparatus according to claim 1, further comprising an image processor configured to execute image processing, when an operation is performed on the layout display image, reflecting the performed operation on the display image data corresponding to the layout display image on which the operation has been performed.

3. The image transmission apparatus according to claim 2, wherein the performed operation is an operation of changing the size of the layout display image, the image processor converts the resolution of the display image data according to the change of the size, and the transmitter transmits the display image data, on which the image processing has been performed, to the corresponding image projection apparatus.

4. The image transmission apparatus according to claim 3, wherein the display controller displays an image, the size of which has been changed, on the display device using the display image data on which the image processing has been performed.

5. The image transmission apparatus according to claim 2, wherein the performed operation is an operation of changing the display position of the layout display image, the image processor changes the storage location of the display image data in the storage device according to the change of the display position, and the transmitter transmits the display image data, on which the image processing has been performed, to the corresponding image projection apparatus.

6. The image transmission apparatus according to claim 2, wherein the storage controller secures a content storage region for storing the display image data in the storage device corresponding to the number of content displayed on the display device, and the display image data is stored in a storage location corresponding to the projection position of an image in each content storage region projected by the image projection apparatus.

7. The image transmission apparatus according to claim 6, wherein the image processor executes image processing on the image data in the content storage region.

8. The image transmission apparatus according to claim 6, wherein the content storage region is secured corresponding to the arrangement of the image projection apparatuses connected, the storage controller stores the display image data in a plurality of content storage regions corresponding to the adjacent image projection apparatuses in the case where the capacity of the display image data exceeds the capacity of the content storage region, and the display controller displays a layout display image corresponding to the display image data in the plurality of adjacent layout display regions.

9. The image transmission apparatus according to claim 2, wherein the storage controller secures a transmission storage region for storing the display image data, which is to be transmitted to the image projection apparatus, in the storage device corresponding to the number of image projection apparatuses connected, and the display image data is stored in a storage location corresponding to the projection position of an image in each transmission storage region projected by the image projection apparatus.

10. The image transmission apparatus according to claim 9, wherein the image processor executes image processing on the image data in the transmission storage region.

11. The image transmission apparatus according to claim 1, further comprising:
   a selector configured to select one content portion from a plurality of content portions for display on the display device; and
   a designator configured to designate the image projection apparatus to project the selected content, wherein the storage controller stores the correspondence relationship between the selected display image data and the designated image projection apparatus in the storage device.

12. The image transmission apparatus according to claim 1, wherein an aspect ratio of the layout display region is the same as that of a display screen of the display device.

13. The image transmission apparatus according to claim 1, wherein the display controller changes the overlapping order of the plurality of layout display images in the layout display region in response to an operation of changing the overlapping order of the plurality of layout display images.

14. An image display control method in image transmission, comprising:

generating display image data of each of a plurality of content elements, at least a part of which is to be displayed on a display device;

storing in a storage device a correspondence relationship between each of a plurality of connected image projection apparatuses and each set of the generated display image data;

displaying a plurality of primary display images on a primary screen of the display device using the display image data;

displaying a plurality of layout display images, which correspond to the plurality of primary display images, in a layout display region on the display device, the layout display region occupying an area smaller than the primary screen;

changing the layout of the plurality of layout display images in the layout display region independently of the plurality of primary display images; and transmitting each set of the corresponding display image data to each connected image projection apparatus, wherein projected images displayed by the connected image projection apparatuses are displayed in accordance with the layout of the plurality of layout display images in the layout display region.

15. A non-transitory computer-readable storage medium on which an image transmission program is recorded, the program comprising computer-readable instructions executable by a computing device to perform the function of:

generating display image data of each of a plurality of content elements, at least a part of which is to be displayed on a display device;

storing in a storage device a correspondence relationship between each of a plurality of connected image projection apparatuses and each set of the generated display image data;

displaying a plurality of primary display images on a primary screen of the display device using the display image data;

displaying a plurality of layout display images, which correspond to the plurality of primary display images, in a layout display region on the display device, the layout display region occupying an area smaller than the primary screen;

changing the layout of the plurality of layout display images in the layout display region independently of the plurality of primary display images; and transmitting each set of the corresponding display image data to each connected image projection apparatus, wherein projected images displayed by the connected image projection apparatuses are displayed in accordance with the layout of the plurality of layout display images in the layout display region.

* * * * *